(12) United States Patent
Murphy et al.

(10) Patent No.: US 7,512,833 B1
(45) Date of Patent: Mar. 31, 2009

(54) UNIVERSAL IMAGING UTILITY PROGRAM

(75) Inventors: Adam C. Murphy, 1446 S. 55th St., West Milwaukee, WI (US) 53214; Jeremy C. Brazille, Kingston (CA)

(73) Assignee: Adam C. Murphy, Muskego, WI (US)

( * ) Notice: Subject to any disclaimer, the term of this patent is extended or adjusted under 35 U.S.C. 154(b) by 309 days.

(21) Appl. No.: 11/206,533

(22) Filed: Aug. 18, 2005

Related U.S. Application Data

(63) Continuation of application No. 11/125,037, filed on May 9, 2005, now abandoned.

(51) Int. Cl.
*G06F 11/00* (2006.01)
(52) U.S. Cl. ......................................... 714/5
(58) Field of Classification Search .................. 714/1, 714/2, 5; 717/174–178
See application file for complete search history.

(56) References Cited

U.S. PATENT DOCUMENTS

| | | | |
|---|---|---|---|
| 5,537,628 A | 7/1996 | Luebbert | |
| 5,652,876 A | 7/1997 | Ashe et al. | |
| 5,758,165 A | 5/1998 | Shuff | |
| 5,784,635 A | 7/1998 | McCallum | |
| 5,842,011 A | 11/1998 | Basu | |
| 5,911,776 A | 6/1999 | Guck | |
| 6,108,697 A | 8/2000 | Raymond et al. | |
| 6,230,310 B1 | 5/2001 | Arrouye et al. | |
| 6,253,300 B1 | 6/2001 | Lawrence et al. | |
| 6,260,043 B1 | 7/2001 | Puri et al. | |
| 6,298,443 B1 | 10/2001 | Colligan et al. | |
| 6,304,965 B1 | 10/2001 | Rickey | |
| 6,336,124 B1 | 1/2002 | Alam et al. | |
| 6,377,952 B1 | 4/2002 | Inohara et al. | |
| 6,535,976 B1 | 3/2003 | Hoggarth et al. | |
| 6,567,828 B2 | 5/2003 | Inohara et al. | |
| 6,590,674 B1 | 7/2003 | Orton | |
| 6,658,625 B1 | 12/2003 | Allen | |
| 6,662,186 B1 | 12/2003 | Esquibel et al. | |
| 6,725,426 B1 | 4/2004 | Pavlov | |
| 6,735,765 B1 | 5/2004 | Schumacher | |
| 6,763,501 B1 | 7/2004 | Zhu et al. | |
| 6,804,774 B1 | 10/2004 | Larvoire et al. | |
| 6,993,642 B2 * | 1/2006 | Burkhardt et al. | 713/1 |
| 2002/0069227 A1 | 6/2002 | Chidiac et al. | |
| 2002/0143823 A1 | 10/2002 | Stevens | |
| 2003/0037302 A1 | 2/2003 | Dzienis | |
| 2004/0030995 A1 | 2/2004 | Bhogal et al. | |
| 2004/0117338 A1 * | 6/2004 | Kennedy et al. | 707/1 |
| 2004/0168125 A1 | 8/2004 | van der Meer et al. | |
| 2004/0172601 A1 | 9/2004 | Rettig et al. | |
| 2004/0205613 A1 | 10/2004 | Li et al. | |
| 2004/0205616 A1 | 10/2004 | Rosenberg et al. | |

(Continued)

*Primary Examiner*—Bryce P Bonzo
(74) *Attorney, Agent, or Firm*—Sylke Law Offices, LLC; C. Thomas Sylke

(57) ABSTRACT

A method and program for setting up a Master computer for imaging a computer hard drive from one hardware platform to a second, dissimilar hardware platform is disclosed. The program will be deployed onto a first computer. The program strips down the operating system files, hardware driver files, and registry settings of the computer to a very basic level, and resets certain system files, driver files, and registry settings. The Master computer may then be cloned or imaged onto a second computer without the second computer crashing. The program allows cloning and conversion between computers, even if the computers are different models or are made by different manufacturers.

25 Claims, 1 Drawing Sheet

U.S. PATENT DOCUMENTS

2004/0243935 A1    12/2004  Abramovitch
2005/0229175 A1*   10/2005  McCrory et al. ............ 717/177
2006/0041883 A1*    2/2006  Chambers et al. ........... 717/174

* cited by examiner

UNIVERSAL IMAGING UTILITY PROGRAM

RELATED APPLICATION

This application is a continuation of U.S. application Ser. No. 11/125,037, filed May 9, 2005 now abandoned.

BACKGROUND OF THE INVENTION

The present invention relates to computer operating systems and more specifically, to replicating or cloning operating systems to computers or computer systems that have different hardware configurations than the original cloned system.

For instance, programs have been developed, commonly referred to as "Drive Imaging", "Disk Imaging", or "Disk Cloning" applications, such as Symantec Ghost. They are used to copy the complete contents of a computer hard drive from a computer to another computer. The copy of the "Master" computer hard drive is referred to as a "Disk Image." However, such images may generally be deployed only onto other computers having the same hardware configuration as the Master computer hard drive. If the configurations are not the same, the result is that the computer system receiving the disk image, will fail to work correctly. The result is often a system crash such as a "Blue Screen" or continual, looping reboot.

Attempts have been made to clone or copy computing systems. For instance, U.S. Pat. No. 6,804,774, assigned to Hewlett-Packard, discloses a software transition aid for rebooting a target computer from a source computer. After a cloned image is received from a source computer and booted onto the target computer, the transition aid assists in properly rebooting the target computer. While this helps in booting the target computer, it does not necessarily result in both computers having identical disk images. Consequently, problems and errors associated with the computers interacting improperly with each other still may result.

It is currently necessary to create a Master Disk Image for each individual hardware platform in an organization. It would be advantageous to have a single disk image that would be able to handle a wide variety of processors and a wide variety of different manufacturers' hardware. The program should be universally usable with different programs, hardware, and computers. Such a program would be advantageous in minimizing the time needed to develop, setup and install a local network and also reduce the time needed to restore troubleshoot and restore damaged computer systems.

SUMMARY OF THE INVENTION

The present invention is a universal imaging utility (UIU) program. An operating system can be installed on one computer, such as a desktop computer, using a third party disk imaging application, and can be imaged and deployed onto another computer, such as a laptop computer, without needing the hardware setups of the computers to be identical and without having to create a disk image for each individual hardware setup. The present invention allows easy conversion between the different hardware.

The UIU program will be installed and setup on a Master computer. The program will "strip down" the operating system to a basic level, similar to when the operating system was installed on the Master computer from a boot-up CD. The UIU then installs a large library of computer hardware drivers, and modifies several system settings and files to allow for deployment to different hardware platforms, regardless of make or model of the hardware platform.

DESCRIPTION OF THE PREFERRED EMBODIMENT

Figure 1:
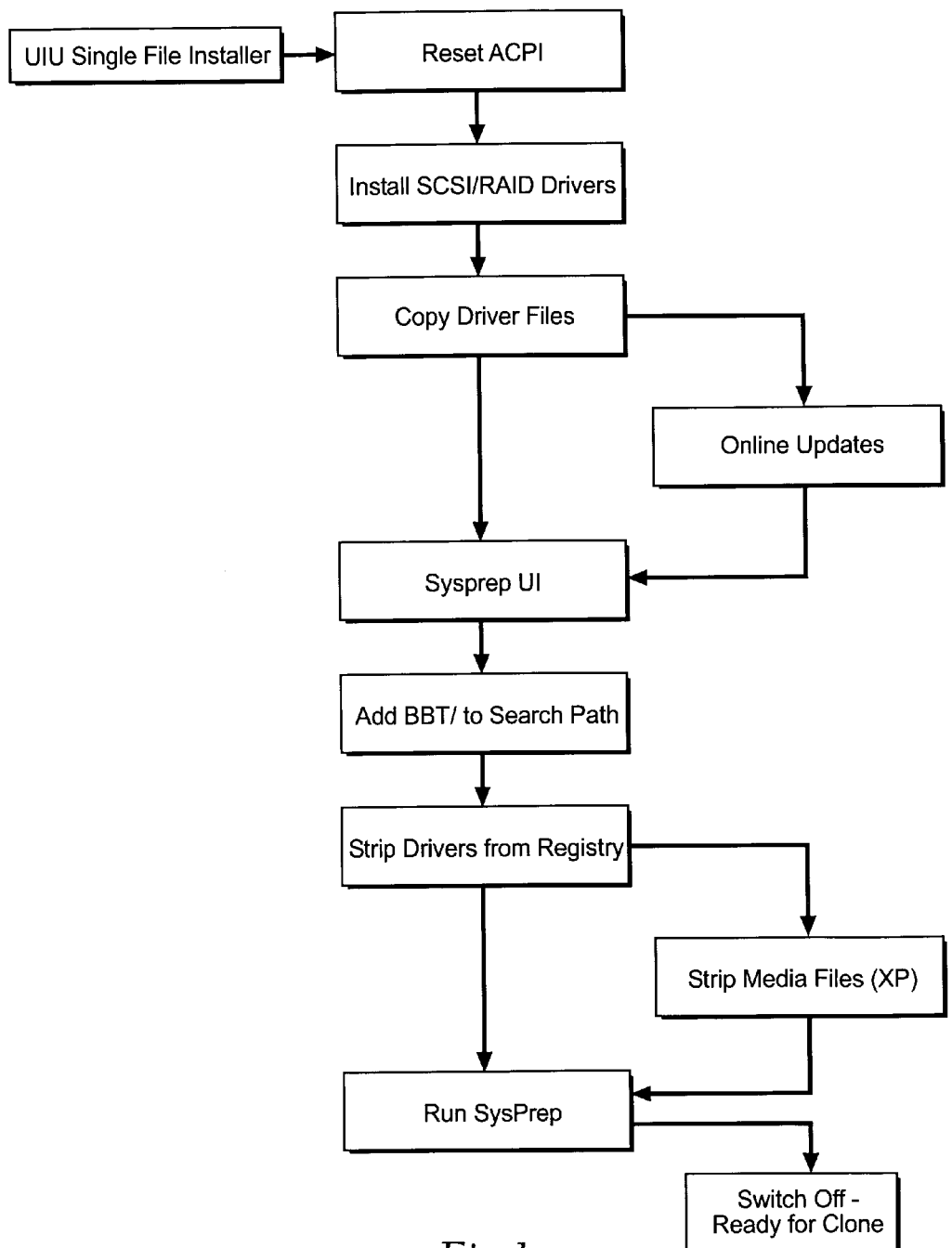
FIG. 1 is a schematic representation of a process of cloning a computer according to the present invention.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

The present invention provides an easy-to-use method and program for copying, or imaging, an operating system from one computer platform to a second platform, regardless of the manufacturer, make or model of either of the computer platforms. The invention simplifies the setup of a computer network by minimizing errors or problems that are currently encountered when dealing with different hardware types. An operating system is setup on a Master computer. The operating system, including the contents of the hard drive, may then be copied to other computers within the network. The operating system may be copied to computers with different hardware components without the problems of the computer or computers crashing. Furthermore, the individual operating system does not have to be downloaded or installed onto each individual computer, but will be transferred in whole from the central computer using a third party disk imaging application. Along with having a more symmetrical resultant computing network than prior art programs, the present invention is more efficient and less time consuming that the prior art.

The invention is a universal imaging utility (UIU) software program, which allows formation of an image that will be identical on varying computer setups. Imaging refers to "disk imaging" or "disk cloning" for the hard drive of a computer. That is, imaging refers to the process of copying or cloning an entire hard drive of a computer, including the operating system, application programs, and other data on the hard drive, to another computer. As an example used herein, the UIU program is directed towards Microsoft operating systems, but it is understood that the program can be employed for other operating systems.

For example, a disk image of a Dell Optiplex GX110 may need to be transferred to a Dell Optiplex GX270. Previously, deploying the GX110 image onto the GX270 would cause the operating system to crash on the GX270, or leave the GX270 unusable with a "blue screen." Consequently, a disk image would need to be designed for each unique hardware platform, or each specific PC make and model combination.

The individual computers may be laptops, desktops, servers, or other computer types, and may also be from different manufacturers of computers, such as, but not limited to: Dell, HP, Compaq, IBM, Sony, Toshiba, and Panasonic. Furthermore, the individual hardware component manufacturers include, but are not limited to: Intel, 3Com, Via, nVidia, ATI, SoundMax, etc. The program will work with both Advanced Configuration and Power Management (ACPI) systems and non-ACPI systems.

Because the UIU program contains hardware drivers for over 35,000 hardware components, it will be compatible with virtually any computer. The UIU program will be approximately 350 MB in size. The program is designed to work with drivers from the hardware component manufactures (Intel, 3Com, nVidia, etc.), and not necessarily the same computer manufacturers' drivers (Dell, HP, IBM, Compaq, etc.) Thus, the file size is relatively small with respect to the number of hardware components that it may handle.

Some operating systems have utility programs used for installation and preparation. For instance, a Microsoft operating system can be setup by using a utility file, called Sysprep, which resets portions of the operating system on the Master image to a basic level, and then searches for new hardware after that image has been deployed. The UIU program strips the master image down to an even more basic level than Sysprep, resets several settings and hardware components, and then launches the Sysprep application to gain the hardware discovery function after image deployment. The operating system is stripped down and reset to essentially the minimum basic functional level, which removes software and hardware incompatibility, and prevents a computer from crashing during a cloning process.

Master Image PC Setup

An operating system will be installed onto a master computer, preferably a system such as Windows 2000 or Windows XP, and preferably installed onto an empty or blank hard drive. It is not necessary to include drivers or driver updates from the computer manufacturer or hardware component manufacturers. Because the purpose of the UIU program is to provide a clean, universal image on all the computers in the system, installing additional hardware may impede the process. The program may be installed with both Advanced Configuration and Power Management (ACPI) systems and non-ACPI systems. The Master computer will contain a Device Manager file, which will allow the user to determine whether the system in an ACPI of non-ACPI system. When the Device Manager is accessed, a Non-ACPI system will show that the computer is a Standard PC, while an ACPI system will display Advanced Configuration and Power Interface (ACPI) PC, ACPI Uniprocessor PC, or ACPI Multiprocessor PC. The invention will work with both systems, but it may be necessary to create two separate Master images, one for the ACPI systems, and one for the non-ACPI systems. However, a single UIU program is used to create both master images.

Once the default settings have been set on the Master computer, the computer will be rebooted to determine if there is any new hardware found on the system. If new hardware is found on the system, the new hardware drivers should be uninstalled from the system and the system should be rebooted again. This will allow the Master computer to start from a clean system for creating a master UIU image or images.

As previously stated, the present invention is compatible with all types of operating systems and hardware configurations. However, for a more efficient process, the selected Master computer preferably will not be the newest computer in the computer network. This will allow the majority of the hardware on the Master computer to be detected without additional manufacture drivers or applications. Likewise, a Master computer with integrated network, sound, and video cards is preferred over a computer that has interface (PCI) cards, since this will minimize possible conflicts when installing the UIU program.

Creation of a System Preparation File

Once the Master computer has been configured, a preparatory program, such as Microsoft Sysprep 2.0, will be configured. These programs may be included with the UIU program, or may be available from the manufacturer of the operating system. The Sysprep answer file, Sysprep.inf, for example, will allow the user to modify the target paths, domain and workgroup settings, and other administrative settings necessary for the operating system setup once the Master Disk Image is deployed. Because an individual server or operating system may come with Sysprep program, the user should verify that the answer file created for the Sysprep program is compatible with the UIU program.

Setup of the UIU Program

Once the Master Computer is properly configured and the Sysprep file(s) have been copied to the Master Computer, the UIU program may be installed on the Master Computer. The UIU Setup.exe program may be installed from a shared network drive or from compact disk. Installation of the UIU program requires minimal interaction from the user. At this point the UIU installation is complete.

Capturing an Image from the Master Computer

The final step for using the UIU program is to capture an image of the Master computer's hard drive. Any compatible disk imaging program known in the art, such as Symantec Ghost, or PowerQuest Drive Image, may be used to boot the Master Computer and capture an image. The image should be created and captured in DOS, regardless of the imaging program used to create the image. Once the image is captured, it can be deployed to nearly any hardware platform, where the Sysprep hardware detection will take over to install the new hardware components.

The UIU Program

Generally, the invention follows the steps shown in FIG. 1. The Operating System is correctly installed and setup on a Master computer. A preparatory program is copied to the Master computer. Updates may be introduced, possibly from an on-line site. The UIU program will be installed in order to strip files and settings from the computer and reset base files, and the necessary drivers are installed and copied. For specific programs, such as Windows Media XP, additional stripping steps may be required for extra media files. Finally, the Sysprep application will be launched. The computer will be switched off, and the computer will be ready for cloning procedures to other computers. The UIU program is preferably written in Visual Basic and/or Visual C++. Unless indicated, the detailed example will refer to a Windows-based operating system.

Pre-Installation

Once the Master computer has been configured as discussed above, the program will work with both Advanced Configuration and Power Management (ACPI) systems and non-ACPI systems. The ACPI setting of the computer should be changed to "Advanced Configuration and Power Interface (ACPI) PC", which will prevent Uni- and Multi-Processor computers from causing a "blue screen" when receiving a UIU image. As stated above, the computer will be fooled into believing the installed drivers were originally located on the computer.

SYSPREP User Interface

Once the registry settings have been properly established, a User Interface can be designed to ease the setup process of the clone and, also, to customize the settings for the clone. A "Sysprep.inf" file will be formed. For instance, settings to allow file/printer sharing, display resolutions, date, time, or other features may be included in the file. An example of a Sysprep.inf file may be:

[Unattended]

OemSkipEula=Yes; (Skips End User License Agreement)

TargetPath=\WINDOWS; (Location of Windows XP installation)

UpdateInstalledDrivers=yes

DriverSigningPolicy=Ignore; (Loads all drivers during Mini-Setup regardless of signature)

[GuiUnattended]
AdminPassword=; (enter the local machine administrator password)
OEMSkipRegional=1; (Skips regional settings dialog, installs defaults set during original Master setup)
TimeZone=35; (Sets TimeZone—a listing of time zones can be included with the program. The Windows XP CD contains a complete list of time zone codes)
OemSkipWelcome=1; (Skips the welcome page in mini-setup)
[UserData]
FullName=Default; (This is registration information only, not User ID information)
OrgName=Organization; (This is registration information only, not User ID information)
ComputerName=*; (Automatically names computer during mini-setup)
ProductID=XXXXX-XXXXX-XXXXX-XXXXX-XXXXX;
[Identification]; (Domain or Workgroup settings. Delete domain or workgroup information as necessary.)
JoinDomain=
DomainAdmin=
DomainAdminPassword=
JoinWorkgroup=
[Networking]; (Installs standard network components—TCP/IP, Client for Microsoft Networks, File/Print Sharing, etc.)
InstallDefaultComponents=Yes Most of these settings can be set programmatically without having to display options from a GUI, but some settings, such as the OS Registration Key, may be manually entered. Accordingly, the above is only an example and the file may be customized to any individual arrangement.

UIU Installation

It is advantageous to install as many system interface (SCSI) and disk array (RAID) devices as possible. This greatly increases the possible number of hardware configurations that will be able to boot properly using the program. The program will work together with an application program interface (API), such as Windows API, setupapi.dll. The following functions used from the API are:

SetupDiGetDeviceRegistryProperty( )—This function locates any existing drivers for the specified hardware ID;

SetupDiSetDeviceRegistryProperty( )—If a driver for a specified hardware ID does not exist, this function adds a driver;

SetupDiCallClassInstaller( )—This function transforms the registry element into an actual devnode if a devnode does not exist;

UpdateDriverForPlugAndPlayDevices( )—This function updates the driver with the new specified information.

Once these functions are carried out, a text file is created and stored on the computer, preferably in the ".inf" file of the drive, and also in the corresponding hardware ID. The text file may have as many entries as needed to correspond to number of drivers and/or files installed into the system. An example format may be:

"c:\windows\inf\scsi.inf","detected\aha154x"
"c:\windows\inf\scsi.inf","detected\sparrow"
"c:\windows\inf\scsi.inf","detected\cpqarray"
"c:\windows\inf\scsi.inf","detected\dac960 nt"

A short program encrypts the file, and compresses it into a format that will be read by the hardware installer. This program will be run when the initial installation of the UIU program takes place and will be stored in a folder until the file is ready to be written onto an individual CD. The hardware installer reads the file, and the decompressed and decrypted file is installed into the Windows configuration for the specific hardware device. Additionally, an error log may be recorded for future reference.

The SCSI and RAID controls can be booted directly from the Master Computer now that the drivers have been pre-installed. By doing this, the computer believes the drivers were installed previously, or were original files, and does not reject the drivers.

Registry Stripping and File Preparation

Once the initial installations and configurations are performed, the program strips the existing drivers from the Master computer so that new drivers may be installed on new computers. A ".sys" file is copied onto the Master computer, typically looking similar to: pciide.sys copied to [SystemFolder]drivers.

Once the ".sys" file is copied, the proper Registry Settings must be added to the Master computer, such as:

HKEY_LOCAL_MACHINE/SOFTWARE/Microsoft/Windows/CurrentVersion="%SystemRoot%\inf; %SystemRoot%\inf\BBT"
Create \200 subkey and populates with values:
"DriverDesc"="Standard Dual Channel PCI IDE Controller"
"InfSection"="pciide_Inst"
"MatchingDeviceId"="pci\cc_0101"
Create SYSTEM\CurrentControlSet\Control\CriticalDeviceDatabase\pci#cc_0101 and populate with:
"ClassGUID"="{4D36E96A-E325-11CE-BFC1-08002BE10318}"
"Service"="pciide"
Create SYSTEM\CurrentControlSet\Services\PCIIde and populate with:
"ImagePath"="system32\DRIVERS\pciide.sys"
"Start"=0

Depending on the specific operating system, additional Registry settings must be added. For example, if a Microsoft Windows XP operating system is to be cloned, the following registries would also be added to the clone:

HKEY_LOCAL_MACHINE/SYSTEM/CurrentControlSet/Control/Class/
{4D36E96C-E325-11CE-BFC1-08002BE10318}/
0000/
   "ProviderName"="Microsoft"
      "MatchingDeviceId"="ms_mmmci"
      "InfSectionExt"=".NT"
      "InfSection"="MS_MMMCI"
      "InfPath"="wave.inf"
      "DriverVersion"="5.1.2535.0"
      "DriverDesc"="Media Control Devices"
      "DriverDateData"=hex:00,80,62,c5,c0,01,c1,01
      "DriverDate"="7-1-2001"
0001/
   "ProviderName"="Microsoft"
      "MatchingDeviceId"="ms_mmvid"
      "InfSectionExt"=".NT"
      "InfSection"="MS_MMVID"
      "InfPath"="wave.inf"
      "DriverVersion"="5.1.2535.0"
      "DriverDesc"="Video Codecs"
      "DriverDateData"=hex:00,80,62,c5,c0,01,c1,01
      "DriverDate"="7-1-2001"
0002/
   "ProviderName"="Microsoft"
      "MatchingDeviceId"="ms_mmacm"

"InfSectionExt"=".NT"
"InfSection"="MS_MMACM"
"InfPath"="wave.inf"
"DriverVersion"="5.1.2535.0"
"DriverDesc"="Audio Codecs"
"DriverDateData"=hex:00,80,62,c5,c0,01,c1,01
"DriverDate"="7-1-2001"
0003/
"ProviderName"="Microsoft"
"MatchingDeviceId"="ms_mmvcd"
"InfSectionExt"=".NT"
"InfSection"="MS_MMVCD"
"InfPath"="wave.inf"
"DriverVersion"="5.1.2535.0"
"DriverDesc"="Legacy Video Capture Devices"
"DriverDateData"=hex:00,80,62,c5,c0,01,c1,01
"DriverDate"="7-1-2001"
0004/
"ProviderName"="Microsoft"
"MatchingDeviceId"="ms_mmdrv"
"InfSectionExt"=".NT"
"InfSection"="MS_MMDRV"
"InfPath"="wave.inf"
"DriverVersion"="5.1.2535.0"
"DriverDesc"="Legacy Audio Drivers"
"DriverDateData"=hex:00,80,62,c5,c0,01,c1,01
"DriverDate"="7-1-2001"

Along with adding new settings into the registry, settings that are currently on the computer must be removed. A Windows operating may have the following registry settings removed:
HKEY_LOCAL_MACHINE\SYSTEM\CurrentControlSet\Control\Class\{4D 1536E96A-E325-11CE-BFC1-08002BE10318}
HKEY_LOCAL_MACHINE\SYSTEM\CurrentControlSet\Control\Class\{4D 36E968-E325-11CE-BFC1-08002BE10318}
HKEY_LOCAL_MACHINE\SYSTEM\CurrentControlSet\Control\Class\{4D 36E96D-E325-11CE-BFC1-08002BE10318}
HKEY_LOCAL_MACHINE\SYSTEM\CurrentControlSet\Control\Class\{4D 36E96E-E325-11CE-BFC1-08002BE10318}
HKEY_LOCAL_MACHINE\SYSTEM\CurrentControlSet\Control\Class\{4D 36E972-E325-11CE-BFC1-08002bE10318}
HKEY_LOCAL_MACHINE\SYSTEM\CurrentControlSet\Control\Class\{4D 36E973-E325-11CE-BFC1-08002BE10318}
HKEY_LOCAL_MACHINE\SYSTEM\CurrentControlSet\Control\Class\{4D 36E974-E325-11CE-BFC1-08002BE10318}
HKEY_LOCAL_MACHINE\SYSTEM\CurrentControlSet\Control\Class\{4D 36E975-E325-11CE-BFC1-08002BE10318}

HKEY_LOCAL_MACHINE\SYSTEM\CurrentControlSet\Control\Class \{6BDD1FC5-810F-11D0-BEC7-08002BE2092F}

Additional Registry Settings may need to be removed. For example, the following setting would removed from a Windows XP operating system:
HKEY_LOCAL_MACHINE\SYSTEM\CurrentControlSet\Control\Class\{4D 36E96C-E325-11CE-BFC1-08002BE10318}

Additionally, the Master computer may have cached, or backed up driver files, possibly in a "\inf" folder, that will conflict with new drivers upon deployment. These files may be stripped from the clone as well:
delete %WINDOWS%\INF\OEM*.*
delete %WINDOWS%\INF\ *.PNF
delete %WINDOWS%\INF\INFCACHE*.*

Driver File Installation

After setting up and prepping the clone, the driver files are installed onto the Master Computer. The UIU program copies them into a file on the clone, for example %WINDOWS%/inf/BBT, which may be added as a separate folder. Putting the driver files in a separate file allows for easier access for searching when updates or new drivers are to be added to the clone. These hardware driver files will then be accessed by Sysprep once the Master image is deployed.

Additionally, the UIU program will work with an Online Update Service, such as a Web server, IIS, or a similar network share system, to provide software updates as needed for the hardware drivers. The updating process will be done with a method similar to the method or methods currently employed by a Web browser for reading .html documents. Thus, no special coding or maintenance is needed for this process.

Furthermore, the UIU program may be constructed so that updates are processed through the Master Computer. This would limit the amount of necessary Internet traffic needed to update a computing network. Likewise, by passing through the Master Computer, it may be easier to keep the network uniform. Such updates may be performed automatically or manually.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A method for cloning an operating system from a first computer having a hard drive containing an operating system, the method comprising:
generating a minimum basic functional level configuration of the operating system by:
stripping at least one driver file, system file or registry setting from the operating system; and
resetting at least one driver file, system file or registry setting;
wherein the minimum basic functional level configuration is bootable on a plurality of different computer hardware configurations;
further wherein generating the minimum basic functional level configuration of the operating system is performed on an operating system currently running on the first computer.

2. The method of claim 1 wherein generating the minimum basic functional level configuration is performed by a universal imaging utility program installed on the first computer.

3. The method of claim 1 wherein stripping a driver file, system file or registry setting and resetting the stripped driver file, system file or registry setting comprises replacing a first driver file, system file or registry setting with a second driver file, system file or registry setting.

4. The method of claim 1 wherein resetting at least one driver file, system file or registry setting comprises setting the configuration and power management setting of the first computer to the simplest level required for bootability of the minimum basic functional level configuration on the plurality of computers having different hardware configurations.

5. The method of claim 1 further comprising deploying the minimum basic functional level configuration from the first computer to a plurality of target computers, wherein the plurality of target computers have a plurality of hardware configurations that differ from the hardware configuration of the first computer.

6. The method of claim 5 wherein generating the minimum basic functional level configuration does not use any information regarding any target computer.

7. The method of claim 1 further comprising updating one or more of the following:
   an ACPI driver file of the minimum basic functional level configuration on the first computer; or
   a hard drive driver file of the minimum basic functional level configuration on the first computer.

8. A method for cloning an operating system from a first computer having a hard drive containing an operating system, the method comprising:
   installing a preparatory program onto the first computer;
   configuring the operating system with the preparatory program, wherein configuring the operating system with the preparatory program comprises configuring target paths and search paths of the operating system;
   generating a minimum basic functional level configuration of the operating system by:
      stripping at least one driver file, system file or registry setting from the operating system; and
      resetting at least one driver file, system file or registry setting;
   wherein the minimum basic functional level configuration is bootable on a plurality of different computer hardware configurations.

9. The method of claim 8 wherein generating the minimum basic functional level configuration of the operating system is performed on an operating system currently running on the first computer.

10. The method of claim 9 wherein generating the minimum basic functional level configuration is performed by a universal imaging utility program installed on the first computer.

11. The method of claim 8 wherein generating the minimum basic functional level configuration is performed by a universal imaging utility program installed on the first computer.

12. The method of claim 8 wherein stripping a driver file, system file or registry setting and resetting the stripped driver file, system file or registry setting comprises replacing a first driver file, system file or registry setting with a second driver file, system file or registry setting.

13. The method of claim 8 wherein resetting at least one driver file, system file or registry setting comprises setting the configuration and power management setting of the first computer to the simplest level required for bootability of the minimum basic functional level configuration on the plurality of computers having different hardware configurations.

14. The method of claim 8 further comprising deploying the minimum basic functional level configuration from the first computer to a plurality of target computers, wherein the plurality of target computers have a plurality of hardware configurations that differ from the hardware configuration of the first computer.

15. The method of claim 14 wherein generating the minimum basic functional level configuration does not use any information regarding any target computer.

16. The method of claim 8 further comprising updating one or more of the following:
   an ACPI driver file of the minimum basic functional level configuration on the first computer; or
   a hard drive driver file of the minimum basic functional level configuration on the first computer.

17. A method for cloning an operating system from a first computer having a hard drive containing an operating system, the method comprising:
   generating a minimum basic functional level configuration of the operating system by:
      stripping at least one driver file, system file or registry setting from the operating system; and
      resetting at least one driver file, system file or registry setting;
   wherein the minimum basic functional level configuration is bootable on a plurality of different computer hardware configuration;
   wherein generating the minimum basic functional level configuration is performed by a universal imaging utility program installed on the first computer.

18. The method of claim 17 wherein stripping a driver file, system file or registry setting and resetting the stripped driver file, system file or registry setting comprises replacing a first driver file, system file or registry setting with a second driver file, system file or registry setting.

19. The method of claim 17 wherein resetting at least one driver file, system file or registry setting comprises setting the configuration and power management setting of the first computer to the simplest level required for bootability of the minimum basic functional level configuration on the plurality of computers having different hardware configurations.

20. The method of claim 17 further comprising deploying the minimum basic functional level configuration from the first computer to a plurality of target computers, wherein the plurality of target computers have a plurality of hardware configurations that differ from the hardware configuration of the first computer.

21. The method of claim 20 wherein generating the minimum basic functional level configuration does not use any information regarding any target computer.

22. The method of claim 17 further comprising updating one or more of the following:
   an ACPI driver file of the minimum basic functional level configuration on the first computer; or
   a hard drive driver file of the minimum basic functional level configuration on the first computer.

23. A computer program product for generating a minimum basic functional level configuration of an operating system running on a computer, wherein the minimum basic functional level configuration is crash-resistant and bootable on a plurality of different computer hardware configurations, the computer program product comprising:
   a machine-readable storage medium; and
   computer program instructions stored within the machine-readable storage medium configured to cause the computer to perform:
      generating the minimum basic functional level configuration of the operating system by:
         stripping at least one driver file, system file or registry setting from the operating system; and
         resetting at least one driver file, system file or registry setting;
      wherein generating the minimum basic functional level configuration of the operating system is performed on an operating system currently running on the computer.

24. A computer program product for generating a minimum basic functional level configuration of an operating system running on a computer, wherein the minimum basic functional level configuration is crash-resistant and bootable on a plurality of different computer hardware configurations, the computer program product comprising:
  a machine-readable storage medium; and
  computer program instructions stored within the machine-readable storage medium configured to cause the computer to perform:
    configuring the operating system with a preparatory program installed on the computer, wherein configuring the operating system with the preparatory program comprises configuring target paths and search paths of the operating system; and
    generating a minimum basic functional level configuration of the operating system by:
      stripping at least one driver file, system file or registry setting from the operating system; and
      resetting at least one driver file, system file or registry setting.

25. A computer program product for generating a minimum basic functional level configuration of an operating system running on a computer, wherein the minimum basic functional level configuration is crash-resistant and bootable on a plurality of different computer hardware configurations, the computer program product comprising:
  a machine-readable storage medium; and
  computer program instructions stored within the machine-readable storage medium configured to cause the computer to perform:
    generating the minimum basic functional level configuration of the operating system by:
      stripping at least one driver file, system file or registry setting from the operating system; and
      resetting at least one driver file, system file or registry setting;
    wherein generating the minimum basic functional level configuration is performed by a universal imaging utility program installed on the computer.

* * * * *